Nov. 13, 1962   M. LESSER ET AL   3,063,558
PROCESS OF TREATING DRY CLEANING SOLVENTS
Filed Nov. 13, 1959

INVENTORS
MORTIMER LESSER
MICHAEL MONCADA

United States Patent Office 3,063,558
Patented Nov. 13, 1962

3,063,558
PROCESS OF TREATING DRY CLEANING SOLVENTS
Mortimer Lesser and Michael Moncada, both % General Clarifier Corp., 841 E. 43rd St., Brooklyn 3, N.Y.
Filed Nov. 13, 1959, Ser. No. 852,724
3 Claims. (Cl. 206—84)

The present invention relates to novel containers and packaged goods.

It is an object of the present invention to provide novel containers which can be fabricated easily and inexpensively.

It is a further object of the invention to provide containers which are rugged yet extremely light in weight.

Still another object of the invention is to provide containers of high thermal and shock insulating value.

Another object of the invention is the provision of disagreeable goods packaged in a form which permits their wise without direct manual contact.

A further object of the invention is to provide means for efficaciously performing a dry cleaning operation.

Other objects and advantages of the invention will become apparent from the following detailed description and claims taken in conjunction with the accompanying drawing in which:

Figure 1:
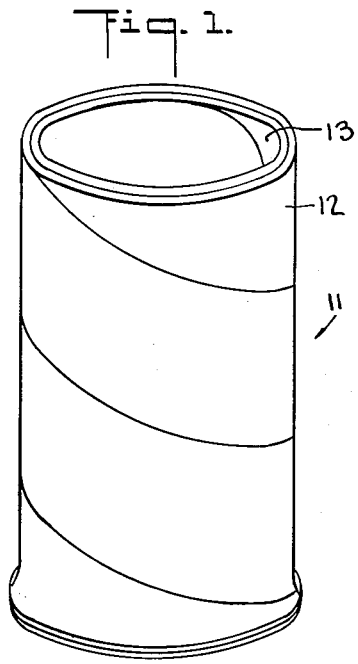
FIG. 1 is a perspective view of a novel container, in accordance with the invention, with the cover removed.

Referring now more particularly to the drawing, in FIG. 1 there is shown a container 11 comprising two layers 12 and 13 of extruded expanded polystyrene sheet material bonded to one another all along their contacting surfaces. The layers are each composed of helically wound thin strips or ribbons, layer 12 being spiralled in clockwise direction while layer 13 is spirally wound in counterclockwise direction.

Figure 2:
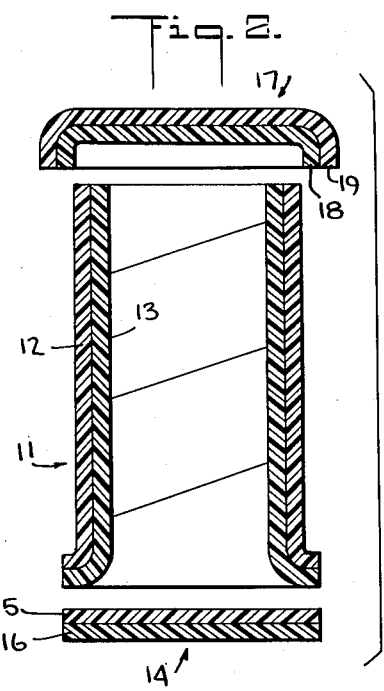
FIG. 2 is an exploded sectional view of the container of FIG. 1 with its cover.
Figure 3:
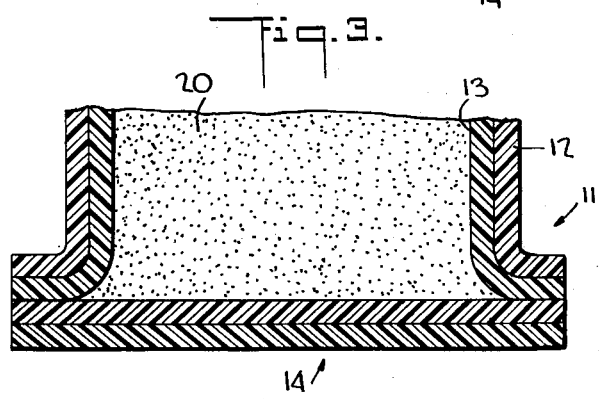
FIG. 3 is a sectional view of the bottom of the container and contents.

As seen in FIGS. 2 and 3 a bottom 14, composed of laminated sheets 15 and 16 having their "grains" extending in opposite directions, is bonded to the lower edge of layer 13 which latter is flared slightly outwardly. A laminated cover 17 including oppositely directed bonded sheets 18 and 19 is shaped so as to provide a friction fit over the container wall. FIG. 3 shows finely divided carbon powder 20 within the container.

The individual layers 12, 13, 15, 16, 18 and 19 can be formed by extrusion of expandable polystyrene beads, prefoamed if desired, under heat and pressure in the form of a relatively thin sheet generally ranging between about 6 and 30 mils and preferably between about 10 and 15 mils in thickness. Heating of the periphery of the extrusion orifice produces a superficial skin with a smooth surface. Even in the absence of such heating, however, the inside of the sheet is made up of numerous individual cells so that the structure is of extremely low density, e.g. less than about 10 and preferably about 2 to 6 pounds per cubic foot in spite of the fact that the density of unfoamed polystyrene is about 65 pounds per cubic foot.

The formation of the individual layers by extrusion is accompanied by a "grain" in machine direction of the extruded sheet. A tear once begun in grain direction will propagate readily; in transverse direction, however, the sheet is extremely strong. By cross-graining there are produced laminated structures of marked strength and resistance to tearing.

The layers of laminate may be bonded together by heat, by application of a plasticizer or small amounts of solvent or by the application of adhesives such as rubber latices, epoxy resins, or the like. The top and bottom of the container may be made by laminating sheets. The cylindrical body 11 may be formed on a helical winding apparatus employing two rolls of relatively narrow sheets unrolled and then wound about a forming mandrel in opposite directions to form the layers 12 and 13; the adhesive, solvent or bonding heat can be applied to the outside of the inner layer which is formed slightly in advance of the outer layer so that the latter is bonded to the inner layer concurrently with its helical winding.

Figure 4:
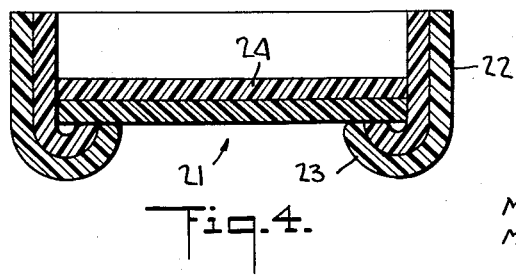
FIG. 4 is a longitudinal sectional view of another member which can be used as top or bottom.

The dish-like top 17 can be formed by drawing a laminated sheet over a heated shaping member; alternatively it can be formed as in FIG. 4. There the end member 21 comprises a cylindrical portion 22 (similar to 11) flared inwardly to form a bead 23 which serves as a seat for a disk 24.

The end member, whether like 17 in FIG. 2 or 21 in FIG. 4 can merely slide over the straight wall 12 of container 11 and be held thereon by friction or it can be secured thereto by any of the means hereinbefore mentioned. The end member 14 can be secured by outward flaring of the bottom of container 11 and joinder of end member 14 thereto by bonding or by crimping. If desired, both top and bottom end members may be of identical configuration and may be joined to the container body 12 in the same manner. Where the joinder is not readily separable, as when effected by bonding or crimping rather than by friction fit, the container should of course be filled before being fully sealed.

The container is characterized by high strength due to the transverse grains of the several layers. It is extremely attractive in appearance. Its cellular structure makes it excellent as an insulator for containing hot or cold beverages, foods, or other articles whose temperature it is desired to maintain substantially unchanged. It can withstand the temperature of boiling water, e.g. hot coffee, without softening. It can withstand refrigeration temperatures without becoming stiff and fragile. The container is also of general use as a container wherever strength and ruggedness are required, its cells functioning as a cushion to absorb sudden or violent shocks.

The container filled with activated carbon finds special utility in dry cleaning operations employing organic solvents such as perchlorethylene or like halogenated hydrocarbons. In dry cleaning, after several uses the cleaning solvent becomes contaminated with dirt from the soiled garments and ordinarily would have to be discarded. By adding activated carbon, stirring and separating the clarified filtrate the filtrate is capable of further use. Unfortunately, however, the addition of the carbon is difficult, wasteful and unpleasant due to its extremely fine subdivision, its blackness and its insolubility in almost all liquids which renders it difficult to clean from the hands and clothes of operators.

The novel polystyrene containers have sufficient strength to contain carbon and be stacked on shelves, withstanding the shocks and knocks attendant thereto. Because the polystyrene is soluble in dry cleaning solvents it is unnecessary to handle the carbon directly at the cleaning plant. Instead the container and contents are dropped into the contaminated dry cleaning solvent and, upon stirring, the container dissolves and the carbon exerts its effect on the solvent in the desired manner.

Variations and modifications may be made without departing from the spirit and scope of the invention as outlined hereinabove and it is intended that such obvious changes be embraced by the annexed claims.

We claim:
1. In a dry cleaning operation wherein contaminated dry cleaning solvent comprising a halogenated hydrocarbon is purified, the improvement which comprises adding to said solvent activated carbon enclosed in a container soluble in said solvent, so that said container upon dissolving releases said activated carbon into said solvent, said container including a tubular body consisting of a plurality of concentric helically wound layers of extruded expanded polystyrene sheet material bonded to one another at their contacting surfaces, and said body being closed at its opposite ends by respective end closures secured to said body and consisting of extruded expanded polystyrene sheet material.

2. In a dry cleaning operation wherein dry cleaning solvent comprising a halogenated hydrocarbon is recovered from cleaned articles and subsequently recycled for reuse on soiled articles, the improvement comprising adding to said solvent a treating agent for said solvent enclosed in a container made of extruded expanded polystyrene sheet material soluble in said solvent, whereby said container upon dissolving releases said treating agent into said solvent.

3. A dry cleaning operation according to claim 2, wherein said solvent comprises perchlorethylene.

References Cited in the file of this patent

UNITED STATES PATENTS

| | | |
|---|---|---|
| 1,094,427 | Cook | Apr. 28, 1914 |
| 2,461,539 | Fletcher | Feb. 15, 1949 |
| 2,539,395 | Banks | Jan. 30, 1951 |
| 2,540,565 | Barbieri | Feb. 6, 1951 |
| 2,638,179 | Yard | May 12, 1953 |
| 2,649,392 | Marshall | Aug. 18, 1953 |
| 2,659,934 | Burgess | Nov. 24, 1953 |
| 2,737,503 | Sprague et al. | Mar. 6, 1956 |
| 2,888,043 | Reid | May 26, 1959 |
| 2,917,217 | Sisson | Dec. 15, 1959 |
| 2,942,301 | Price et al. | June 28, 1960 |
| 2,982,457 | D'Alelio | May 2, 1961 |

FOREIGN PATENTS

| | | |
|---|---|---|
| 825,196 | France | Nov. 27, 1937 |
| 492,163 | Great Britain | Sept. 15, 1938 |
| 1,192,726 | France | Apr. 20, 1959 |